United States Patent [19]
Lüders et al.

[11] 4,456,710
[45] Jun. 26, 1984

[54] FILLER-CONTAINING PLASTIC MOLDING COMPOSITION, A PROCESS FOR ITS PREPARATION, AND ITS USE

[75] Inventors: Walter Lüders, Neu-Isenburg; Karlheinz Burg, Wiesbaden, both of Fed. Rep. of Germany

[73] Assignee: Hoechst Aktiengesellschaft, Fed. Rep. of Germany

[21] Appl. No.: 449,160

[22] Filed: Dec. 13, 1982

[30] Foreign Application Priority Data

Dec. 29, 1981 [DE] Fed. Rep. of Germany ....... 3151814

[51] Int. Cl.$^3$ ............................ C08K 3/26; C08K 5/42
[52] U.S. Cl. ..................................... 523/200; 523/208; 524/157; 524/158; 524/159; 524/425; 524/593
[58] Field of Search ................ 523/200, 208; 524/157, 524/158, 159, 425, 593

[56] References Cited

U.S. PATENT DOCUMENTS

| | | | |
|---|---|---|---|
| 2,841,504 | 7/1958 | Liggett | 523/200 |
| 4,082,729 | 4/1978 | Burg et al. | 528/232 |
| 4,174,340 | 11/1979 | Luders et al. | 524/425 |
| 4,259,456 | 3/1981 | Yamada et al. | 524/157 |
| 4,274,987 | 6/1981 | Augustyn | 524/425 |
| 4,274,995 | 6/1981 | Silberberg | 524/425 |
| 4,277,577 | 7/1981 | Burg et al. | 525/154 |
| 4,307,009 | 12/1981 | Luders et al. | 524/157 |

*Primary Examiner*—Herbert J. Lilling
*Attorney, Agent, or Firm*—Connolly and Hutz

[57] ABSTRACT

In filler-containing plastic molding compositions based on polyoxymethylene, very good compatibility between the filler and the polymer matrix is obtained when alkali metal or alkaline earth metal salts of certain sulfonic acids or alkylsulfuric acids are used as adhesion promoters. The result is that in particular the flow properties of the molding compositions and mechanical properties of the plastic articles prepared therefrom as well as the color properties are improved.

8 Claims, No Drawings

FILLER-CONTAINING PLASTIC MOLDING COMPOSITION, A PROCESS FOR ITS PREPARATION, AND ITS USE

Thermoplastic molding compositions based on polyoxymethylene, i.e. oxymethylene homopolymers and oxymethylene copolymers, have been known for years as materials which are mainly used in the industrial sector. It is also known that certain mechanical, electrical and thermal properties of plastics can be improved by adding inorganic fillers. However, these fillers display only low compatibility with the polymers. In polymers filled with inorganic substances this leads, inter alia, to a worsening of some mechanical properties.

Adhesion promoters are frequently incorporated into filled plastic molding compositions in order to promote the incorporation into the polymer of the filler. The most frequently used adhesion promotors for filled plastic molding compositions are organosilanes, which are added highly successfully to polymers which contain silicate-type fillers. In systems containing calcium carbonate as a filler, saturated or unsaturated fatty acids, salts or derivatives of these acids, or also organotitanates are known as adhesion promoters.

Prior art is also the use of sulfur- or phosphorus-organic compounds as adhesion promoters in chalk-filled polyolefins (cf. German Offenlegungsschrift No. 2,910,586 and German Offenlegungsschrift No. 2,735,160).

An addition of, for example, chalk to polyoxymethylene leads as expected to an improvement in stiffness and rigidity in shaped articles prepared therefrom. On the other hand, the chalk has the effect, inter alia, of considerably worsening the resilience properties, which restricts the use of these mixtures for many applications. As a rule there are also discolorations.

The object of the present invention is to provide a molding composition which is based on polyoxymethylene, i.e. oxymethylene homopolymers and oxymethylene copolymers, and contains a filler material and which is free of the disadvantages of the state of the art or has these disadvantages only to a markedly reduced extent and in which in particular shaped articles prepared therefrom have improved mechanical properties, especially in respect of the resilience, and improved color properties.

To achieve this object, certain sulfur-organic compounds are proposed as adhesion promoters.

Accordingly, the invention relates to a polyoxymethylene-based molding composition comprising 90–20 parts by weight of a polyoxymethylene, 10–80 parts by weight of an alkaline earth metal carbonate, customary additives if appropriate and 0.1–10% by weight, relative to the alkaline earth metal carbonate, of an adhesion promoter, which contains as adhesion promoter a sulfur-organic compound of the formula

  R—SO$_3$—Me   (I)

in which R represents the following radicals:
straight-chain or branched alkyl radical having 6 to 35 carbon atoms or a cycloalkyl radical or alkenyl radical each having 6 to 22 carbon atoms, and the alkenyl radical contains at least one double bond and all these radicals can be substituted by hydroxyl groups or the radicals —OCOR$^1$ or —COOR$^1$ in which R$^1$ represents a straight-chain or branched alkyl radical having 1 to 6, preferably 1 to 3, carbon atoms, an alkylaryl radical having 7 to 22 carbon atoms and which can be substituted in the above manner;
R$^2$—O(CH$_2$CH$_2$O)$_m$— in which R$^2$ denotes an alkyl radical having 6 to 22 carbon atoms and m denotes 1 to 4,
R$^2$—CO—O—(CH$_2$)$_n$— in which R$^2$ has the above meaning and n is equal to 2 to 6,

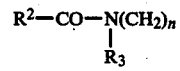

in which R$^2$ and n have the above meaning and R$_3$ represents hydrogen or a straight-chain or branched alkyl radical having 1 to 6, preferably 1 to 3, carbon atoms, and Me denotes an alkali metal ion or alkaline earth metal ion.

The invention also relates to a process for preparing this molding composition and to its use for preparing shaped articles.

The sulfur-organic compounds used according to the invention as adhesion promoters are, corresponding to the above formula (I), alkali metal salts or alkaline earth metal salts of certain sulfonic acids or alkyl-sulfuric acids.

In this formula (I), R preferably represents the following radicals:
straight-chain or branched alkyl radical having 6 to 22, in particular 10 to 17, carbon atoms, optionally substituted by an OH or acetoxy group; or a carbalkoxy group in α-position relative to the SO$_3$Me group; a cycloalkyl radical having 6 to 10 carbon atoms; an alkenyl radical having 1 or 2 double bonds and 10 to 17 carbon atoms, an alkylaryl radical having 3 to 16 carbon atoms in the alkyl group, in particular the monoalkylphenyl radical having a straight-chain or branched alkyl group of 8 to 14 carbon atoms,
R$^2$—O(CH$_2$CH$_2$O)—$_m$ with R$^2$ equal to 10 to 14 carbon atoms and m equal to 2 or 3,
R$^2$—CO—O(CH$_2$)—$_n$ in which R$^2$ has the above meaning and n is equal to 2 or 3,

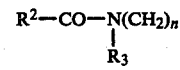

in which R$^2$ and n have the above meaning and R$_3$ represents hydrogen or the alkyl radical having 1 to 3 carbon atoms, and Me, in the formula (I) mentioned, preferably denotes an alkali metal ion, in particular a sodium ion.

The adhesion promoters to be used according to the invention can be prepared by known methods.

Thus, for example, alkylsulfonic acids can be prepared by sulfoxidizing aliphatic hydrocarbons, including paraffins or certain mineral oil fractions, by reacting alkyl halides with sulfites or by hydrolyzing the alkyl-sulfochlorides resulting on sulfochlorination of hydrocarbons (Houben-Weyl, Methoden der Organischen Chemie (Methods of Organic Chemistry), Volume IX, published by Thieme, Stuttgart 1955).

The acids on which the alkali metal alkyl-sulfates are based can be obtained by, for example, reacting the corresponding alcohols with sulfur trioxide.

If R, in the formula (I), is an acyloxy or acylaminoalkylene radical, the acids on which the alkali metal alkyl-sulfonates are based can be prepared in a known way by condensing carboxylic acids with alkoxylenesulfonic acids or aminoalkylenesulfonic acids.

Examples of suitable sulfonates are the potassium and sodium salts of hexane-1-sulfonic acid, heptane-1-sulfonic acid, octane-1-sulfonic acid, octane-2-sulfonic acid, nonane-2-sulfonic acid, nonane-5-sulfonic acid, decane-1-sulfonic acid, undecane-1-sulfonic acid, dodecane-1-sulfonic acid, dodecane-4-sulfonic acid, tetradecane-1-sulfonic acid, hexadecane-1-sulfonic acid, octadecane-1-sulfonic acid, dodecane-1-sulfonic acid, 2,4,4-trimethylpent-1-ene-1-sulfonic acid, hexadec-2-ene-1-sulfonic acid, 2-hydroxy-dodecane-1-sulfonic acid, 2-hydroxy-tetradecane-1-sulfonic acid, 2-hydroxy-hexadecane-1-sulfonic acid, 2-acetoxydodecane-1-sulfonic acid, 2-acetoxytetradecane-1-sulfonic acid, 2-(octanoyloxy)-ethane-1-sulfonic acid, 2-(undecanoyloxy)-ethane-1-sulfonic acid, 2-(dodecanoyloxy)-ethane-1-sulfonic acid, 2-(tetradecanoyloxy)-ethane-1-sulfonic acid, 2-(heptadecanoyloxy)-ethane-1-sulfonic acid, 2-(oleoyloxy)-ethane-1-sulfonic acid, 2-(undecanoylamino)-ethane-1-sulfonic acid, 2-(dodecanoylamino)-ethane-1-sulfonic acid, 2-(tetradecanoylamino)-ethane-1-sulfonic acid, 2-(heptadecanoylamino)-ethane-1-sulfonic acid, 2-(heptadecanoyl-2-methylamino)-ethane-1-sulfonic acid, 2-(octadecanoyl-2-methylamino)-ethane-1-sulfonic acid and 2-(oleoylamino)-ethane-2-sulfonic acid, and the potassium and sodium salts of the sulfonic acids which have different numbers of carbon atoms in the chain and which can be easily prepared by sulfoxidizing aliphatic hydrocarbon mixtures (paraffins or mineral oil fractions).

It is preferable to use sodium hexadec-2-ene-1-sulfonate, sodium 2-hydroxydodecane-1-sulfonate, sodium 2-hydroxytetradecane-1-sulfonate, sodium 2-hydroxyhexadecane-1-sulfonate, sodium 2-acetoxydodecane-1-sulfonate, sodium 2-acetoxytetradecane-1-sulfonate, sodium 2-(oleoyloxy)-ethane-1-sulfonate, sodium 2-(undecanoyloxy)-ethane-1-sulfonate, sodium 2-(heptadecanoyloxy)-ethane-1-sulfonate, sodium 2-(tetradecaamino)-ethane-1-sulfonate and the sodium salt of secondary $C_{13}$–$C_{18}$-n-alkanesulfonate.

Examples of suitable sulfates are the potassium and sodium salts of sulfuric acid mono-(2-dodecyl ether) ethylene glycol ester, sulfuric acid mono-(octyl ether) diethylene glycol ester, sulfuric acid mono-(hexadecyl ether) ethylene glycol ester, sulfuric acid mono-(dodecyl ether) diethylene glycol ester, sulfuric acid mono-(tetradecyl ether) diethylene glycol ester, sulfuric acid mono-(hexadecyl ether) diethylene glycol ester, sulfuric acid mono-(octadecyl ether) diethylene glycol ester, sulfuric acid mono-(dodecyl ether) triethylene glycol ester, sulfuric acid mono-(hexadecyl ether) triethylene glycol ester and sulfuric acid mono-(dodecyl ether) tetraethylene glycol ester.

It is preferable to use the sodium salt of sulfuric acid mono-(dodecyl ether) diethylene glycol ester and the sodium salt of sulfuric acid mono-(dodecyl ether) triethylene glycol ester.

The sulfonates and sulfates to be used according to the invention are added to the molding composition in an amount of 0.1–10% by weight, preferably 0.5–2% by weight, relative to the alkaline earth metal carbonate. It is also possible to use for this purpose mixtures of different sulfonates or of different sulfates and mixtures of these two classes of substance.

The alkaline earth metal carbonate used as the filler can be a natural or synthetic, i.e. precipitated, alkaline earth metal carbonate. Examples of suitable carbonates are limestone powder, chalk, precipitated calcium carbonate, natural magnesite, natural hydromagnesite, synthetic basic magnesium carbonate, calcium magnesium carbonate and dolomite. The calcium carbonates are preferred. The alkaline earth metal carbonates used according to the invention generally have a mean particle diameter of 0.1–50 $\mu$m, preferably 1–10 $\mu$m. Mixtures of various alkaline earth metal carbonates can also be used.

The adhesion promoters according to the invention can be incorporated in the molding composition by various means.

Thus, it is possible to suspend the filler in an organic solvent, add the adhesion promoter directly or dissolved in a suitable solvent, thoroughly stir the mixture at room temperature or at an elevated temperature, distil off the solvent and dry the residue. However, it is also possible to mix the filler with the adhesion promoter in a mixer at room temperature or at an elevated temperature, the temperature being, if appropriate, above the melting point of the adhesion promoter.

If the adhesion promoter is liquid, it can be added dropwise to the filler either directly or diluted with a suitable solvent in a high-speed mixer, or sprayed in the form of a mist onto the filler by means of an atomizing device. Even solid adhesion promoters can be applied to the filler by this method, dissolved in a suitable solvent.

Alternatively, the adhesion promoter can be mixed with the polymer in a mixer and then be added to the untreated filler, or all three components, namely the polymer, the filler and the adhesion promoter, can be mixed at the same time. This simultaneous mixing can be carried out in a premixer, but also in a granulating extruder. Preferably the filler is first treated with the adhesion promoter.

The filler is admixed to the polymer in an amount of 10–80 parts by weight, preferably 30–70 parts by weight.

Suitable base polymers for the plastic molding compositions according to the invention are the known polyoxymethylenes, in particular homopolymers of formaldehyde or trioxane or trioxane copolymers which preferably have a linear structure.

These homopolymers of formaldehyde or trioxane are those formaldehyde or trioxane homopolymers the terminal hydroxyl groups of which are stabilized against degradation in a known way by chemical means, for example by esterification or etherification.

Trioxane copolymers are understood as meaning those copolymers of trioxane and cyclic ethers, cyclic acetals and/or linear polyacetals which have primary alcohol groups.

Possible comonomers are (a) cyclic ethers having 3, 4 or 5, preferably 3, ring members, (b) cyclic acetals which differ from trioxane and have 5–11, preferably 5, 6, 7 or 8, ring members and (c) linear polyacetals, in each case in amounts of 0.1–20, preferably 0.5–10, % by weight. Copolymers of 99–95% by weight of trioxane and 1–5% by weight of one of the abovementioned co-components are most suitable.

Suitable comonomers for trioxane are in particular compounds of the formula

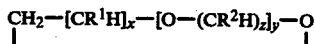
$$CH_2-[CR^1H]_x-[O-(CR^2H)_z]_y-O \qquad (II)$$

in which (A) $R^1$ and $R^2$ are identical or different and each denotes a hydrogen atom, an aliphatic alkyl radical having 1-6, preferably 1, 2, 3 or 4, carbon atoms or a phenyl radical and (a) x is equal to 1, 2 or 3 and y is equal to zero or (b) x is equal to zero, y is equal to 1, 2 or 3 and z is equal to 2 or (c) x is equal to zero, y is equal to 1 and z is equal to 3, 4, 5 or 6, or (B) $R^1$ denotes an alkoxymethyl radical having 2-6, preferably 2, 3 or 4, carbon atoms or a phenoxymethyl radical and x is equal to 1 and y is equal to zero.

Possible cyclic ethers are in particular epoxides, for example ethylene oxide, propylene oxide, styrene oxide, cyclohexene oxide and epichlorohydrin, and phenyl glycidyl ethers.

Suitable cyclic acetals are in particular cyclic formals of aliphatic or cycloaliphatic α,ω-diols having 2-8, preferably 2, 3 or 4, carbon atoms and the carbon chain of which can be interrupted at intervals of 2 carbon atoms by an oxygen atom, for example glycol formal(1,3-dioxolane), propanediol formal(1,3-dioxane), butanediol formal(1,3-dioxepane) and diglycol formal(1,3,6-trioxocane) and 4-chloromethyl-1,3-dioxolane and hexanediol formal-(1,3-dioxoane). Unsaturated formals, such as butenediol formal(1,3-dioxacyclohept-5-ene), are also suitable.

Compounds which can be used as linear polyacetals are not only homopolymers or copolymers of the cyclic acetals defined above but also linear condensates of aliphatic or cycloaliphatic, α,ω-diols with aliphatic aldehydes, preferably formaldehyde. Homopolymers of cyclic formals of aliphatic α,ω-diols having 2-8, preferably 2, 3 or 4, carbon atoms, for example poly-(1,3-dioxolane), poly-(1,3-dioxane) and poly-(1,3-dioxepane), are used in particular.

Compounds having several polymerizable groups in the molecule, for example alkylglycidyl formals, polyglycol diglycidyl ethers, alkanediol diglycidyl ethers or bis-(alkanetriol) triformals, may also be used as additional comonomers for trioxane, in an amount of 0.05-5, preferably 0.1-2, % by weight, relative to the total amount of monomer.

Alkylglycidyl formals are understood as meaning compounds of the formula (III)

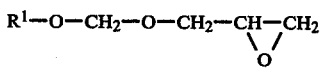
$$R^1-O-CH_2-O-CH_2-CH-CH_2 \qquad (III)$$
$$\diagdown O \diagup$$

in which $R^1$ denotes an aliphatic alkyl radical having 1-10, preferably 1-5, carbon atoms. Alkylglycidyl formals of the above formula and having linear, saturated aliphatic alkyl radicals, for example methylglycidyl formal, ethylglycidyl formal, propylglycidyl formal and butylglycidyl formal, are particularly highly suitable.

The compounds designated polyglycol diglycidyl ethers have the formula (IV)

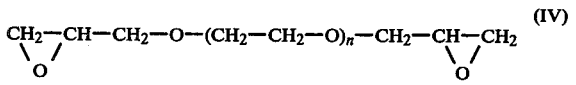
$$CH_2-CH-CH_2-O-(CH_2-CH_2-O)_n-CH_2-CH-CH_2 \qquad (IV)$$

in which n denotes an integer from 2 to 5. Polyglycol diglycidyl ethers of the above formula in which n denotes 2 or 3, for example diethylene glycol diglycidyl ether and triethylene glycol diglycidyl ether, are particularly suitable.

Compounds designated alkanediol diglycidyl ethers have the formula (V)

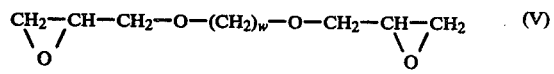
$$CH_2-CH-CH_2-O-(CH_2)_w-O-CH_2-CH-CH_2 \qquad (V)$$

in which w denotes an integer from 2-6, preferably 2, 3 or 4.

Butanediol diglycidyl ether is particularly suitable.

Bis-(alkanetriol) triformals are understood as meaning compounds having a linear and two cyclic formal groups, in particular compounds of the formula (VI)

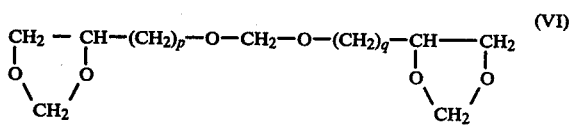

in which p and q each denote an integer from 3 to 9, preferably 3 or 4. Symmetrical bis-(alkanetriol) triformals of the abovementioned formula, in which p and q denote the same number, for example bis-(1,2,5-pentanetriol) triformal and, preferably, bis-(1,2,6-hexanetriol) triformal, are particularly suitable.

The values for the reduced specific viscosity (RSV values) of the polyoxymethylene are in general 0.3-2.0 dl.g$^{-1}$, preferably 0.5-1.5 dl.g$^{-1}$ (measured in butyrolactone stabilized with 2% by weight of diphenylamine, at 140° C. in a concentration of 0.5 g/100 ml).

The crystalline melting points of the polyoxymethylenes are within a range of 140°-180° C., preferably 150°-170° C.; their densities are 1.38-1.45 g·ml$^{-1}$, preferably 1.40-1.43 g·ml$^{-1}$ (measured in accordance with DIN 53,479).

The trioxane copolymers which are used according to the invention and which are preferably binary or ternary are prepared in a known way by polymerizing the monomers in the presence of cationically effective catalysts at temperatures between 0° and 100° C., preferably between 50° and 90° C. (cf. for example U.S. Pat. No. 3,027,352). Examples of catalysts employed in this reaction are Lewis acids, for example boron trifluoride and antimony pentafluoride, and complex compounds of Lewis acids, preferably etherates, for example boron trifluoride diethyl etherate and boron trifluoride di-tert.-butyl etherate. Protonic acids, for example perchloric acid, and salt-like compounds, for example triphenylmethyl hexafluorophosphate, triethyloxonium tetrafluoroborate or acetyl perchlorate, are also suitable. The polymerization can be carried out in bulk, suspension or solution. To remove unstable fractions, the copolymers are advantageously subjected to a controlled thermal or hydrolytic partial degradation to primary alcohol terminal groups (cf. U.S. Pat. Nos. 3,103,499 and 3,219,623).

The homopolymers of formaldehyde or of trioxane which are used according to the invention are also prepared in a known manner by catalytically polymerizing the monomer (cf. for example U.S. Pat. Nos. 2,768,994 and 2,989,505) and stabilized by esterification or etherification against degradation which starts at the end of the chain.

The polymer content of the molding compositions is 90–20, preferably 70–30, parts by weight.

The molding composition according to the invention may also contain the known additives, in particular stabilizers and nucleating agents, antistatic agents, flame retarders, lubricants, plasticizers, pigments, dyestuffs, optical brighteners or mold release agents and the like.

Suitable stabilizers against the effect of heat are in particular polyamides, amides of polybasic carboxylic acids, amidines, for example dicyanodiamide, hydrazines, ureas, poly-(N-vinyllactams) and alkaline earth metal salts of aliphatic, preferably hydroxyl-containing, monobasic to tribasic carboxylic acids having 2–20 carbon atoms, for example calcium stearate, calcium ricinoleate, calcium lactate and calcium citrate. The antioxidants used are in particular bisphenol compounds, preferably diesters of monobasic 4-hydroxyphenylalkanoic acids which have 7–13, preferably 7, 8 or 9, carbon atoms with diols which contain 2–6 carbon atoms. Suitable light stabilizers are α-hydroxybenzophenone derivatives and benzotriazole derivatives. The stabilizers are used in a total amount of 0.1–5, preferably 0.5–3, % by weight (relative to the total molding composition).

Molded articles prepared from the thermoplastic molding composition according to the invention, for example by extrusion or injection-molding, have very good impact strength and tensile impact strength. This makes them suitable in particular for manufacturing industrial articles, such as strips, tubes or machine parts, for example housings, bearing elements and the like. Such shaped articles are also, surprisingly, less markedly discolored than corresponding shaped articles prepared from polyoxymethylene/alkaline earth metal carbonate (for example calcium carbonate) mixtures without the addition of the adhesion promoters according to the invention.

It is a further advantage of the adhesion promoters according to the invention that they improve the feeding behavior of the powder mixture in the extruder and favorably affect the flow properties of the polymer melt, which, in the homogenizing step in the extruder, leads to a higher throughput, and facilitates in injection molding the production of complex parts.

The invention is illustrated in more detail by means of the examples which follow. The parameters used in these examples were determined as follows:

RSV value: Measurement in butyrolactone stabilized with 2% by weight of diphenylamine, at 140° C. in a concentration of 0.5 g/100 ml.

Elongation and tensile strength in accordance with DIN 53,455, impact strength (jaws 30 mm apart, transverse position) and notched impact strength in accordance with DIN 53,453, and tensile impact strength in accordance with DIN 53,448.

Falling bolt test (4 mm thick sheets): The particular sheet under test rests on a support and is subjected to an impact test by allowing a drop hammer which has a variable weight and the impacting part of which is shaped as a hemisphere with a diameter of 9 mm to drop without friction vertically onto the sheet from a height of 1 m. The result of the measurement is quoted as the weight of the drop hammer at which 50% of the sheets are destroyed (mean from 40 drops).

Except for the falling bolt test, the test piece used was ½ a standard bar.

Yellowness value in accordance with DIN 6,167.

EXAMPLES

Example 1

800 parts of calcite-type calcium carbonate having a mean particle diameter of 3 μm and a specific surface area (according to BET) of 2.5 m$^2$/g are suspended in 3,000 parts of ethanol.

12 parts of sodium hexadec-2-ene-1-sulfonate are added with thorough stirring. The suspension is then stirred for 3 hours at room temperature, the ethanol is then distilled off in vacuo, and the residue is dried at 40° C. in a vacuum drying cabinet.

600 parts of the calcium carbonate thus treated are thoroughly mixed, in a ploughshare mixer, with 900 parts of a copolymer of 98% by weight of trioxane and 2% by weight of ethylene oxide and which has primary alcohol terminal groups and an RSV value of 0.8 dl·g$^{-1}$, a density of 1.41 g·cm$^{-3}$ and a crystallite melting point of 166° C., stabilized with 0.1% of tricalcium citrate, 0.02% of dicyanodiamide and 0.5% of 1,6-bis-[β-(3,5-di-tert.-butyl-4-hydroxyphenyl)-propionyloxy]-hexane.

The mixture obtained is extruded, in a twin-screw extruder, to give a strand which is then granulated in a cutting machine. An injection-molding machine turns the granules into test pieces.

In a comparative example, 600 parts of untreated calcium carbonate are mixed in the same way with 900 parts of polyoxymethylene. The mixture is further processed as described above.

The properties of the test pieces are listed in Table I.

Examples 2–9

800 parts of the same calcium carbonate as in Example 1 are mixed in a high-speed mixer at 1,200 rpm for 10 minutes at room temperature with 12 parts of adhesion promoter according to Table I. 600 parts of the calcium carbonate thus treated are mixed with 900 parts of polyoxymethylene which is also the same, and the mixture is further processed as described in Example 1.

The properties of the test pieces can be seen from Table I.

Example 10

A solution of 12 parts of sec.Na n-alkanesulfonate (chain distribution: 3% of $C_{13}$, 25% of $C_{14}$, 30% of $C_{15}$, 25% of $C_{16}$, 15% of $C_{17}$ and 2% of $C_{18}$) in 24 parts of water is sprayed from an atomizing device onto 800 parts of the same calcium carbonate as in Example 1 in the course of 30 minutes in a high-speed mixer at 1,200 rpm.

600 parts of the calcium carbonate thus treated are mixed with 900 parts of polyoxymethylene which is also the same, and the mixture is further processed as described in Example 1.

Table I shows the properties of the test pieces.

Example 11

Example 10 is repeated, except that a solution of 12 parts of the sodium salt of sulfuric acid mono-(dodecyl ether) diethylene glycol ester in 48 parts of water is used in place of the sec.Na n-alkanesulfonate. The mixture is further processed as described in Example 1.

The properties of the test pieces are listed in Table I.

EXAMPLE 12

800 parts of the same calcium carbonate as in Example 1 are mixed at 1,200 rpm for 15 minutes in a heated high-speed mixer at 60° C. with 12 parts of the sodium salt of 2-(octadecanoyl-2-methylamino)-ethane-1-sulfonic acid. 600 parts of the calcium carbonate thus treated are mixed with 900 parts of polyoxymethylene which is also the same, and the mixture is further processed as described in Example 1.

The properties of the test pieces are listed in Table I.

Examples 13–15

800 parts of the calcium carbonate described in Example 1 are mixed for 30 minutes at room temperature in a high-speed mixer with various amounts of a sec.Na n-alkanesulfonate (chain distribution: 3% of $C_{13}$, 25% of $C_{14}$, 30% of $C_{15}$, 25% of $C_{16}$, 15% of $C_{17}$ and 2% of $C_{18}$) at 800 rpm.

The calcium carbonate thus treated is thoroughly mixed in a ploughshare mixer with 1,200 parts of the polyoxymethylene described in Example 1. Further processing takes place as described in Example 1.

In a comparative example, untreated calcium carbonate is mixed in a ratio of 2:3 with polyoxymethylene, and the mixture is further processed as described.

The properties of the test pieces are listed in Table II.

and a specific surface area (according to BET) of 2 $m^2/g$. Further processing takes place as described in Example 1.

In a comparative example, polyoxymethylene is mixed in a ratio of 1:9 with the calcium carbonate described, and the mixture is further processed as described.

The properties of the test pieces are listed in Table III.

TABLE III

|  |  | Comparison | Example 16 |
|---|---|---|---|
| Elongation | % | 26 | 30 |
| Tensile strength | $N/mm^2$ | 55 | 49 |
| Impact strength | $mJ/mm^2$ | 48 | 67 |
| Notched impact strength | $mJ/mm^2$ | 3.1 | 3.7 |
| Tensile impact strength | $mJ/mm^2$ | 160 | 200 |
| Falling bolt test | g | 63 | 88 |

Example 17

400 parts of calcium carbonate having a mean particle diameter of 4 $\mu m$ are mixed for 20 minutes at room temperature in a high-speed mixer at 1,000 rpm with 10 parts of a sec.Na n-alkanesulfonate (chain distribution as in Example 10). After 1,600 parts of the polyoxymethylene as described in Example 1 have been added, the

TABLE I

| Example | Adhesion promoter | Elongation % | Tensile strength $N/mm^2$ | Impact strength $mJ/mm^2$ | Notched impact strength $mJ/mm^2$ | Tensile impact strength $mJ/mm^2$ | Falling bolt test g |
|---|---|---|---|---|---|---|---|
| Comparison | — | 13 | 37 | 20 | 1.4 | 75 | 215 |
| 1 | Na hexadec-2-ene-1-sulfonate | 26 | 35 | 24 | 1.7 | 95 | 235 |
| 2 | $C_{10-16}H_{21-33}COO(CH_2)_3$—$SO_3Na$ | 22 | 35 | 24 | 2.3 | 100 | 260 |
| 3 | $C_{14}H_{29}CH(OH)CH_2$—$SO_3Na$ | 22 | 35 | 27 | 2.1 | 100 | 250 |
| 4 | $C_{13}H_{27}CH=CH$—$CH_2SO_3Na$ | 26 | 33 | 31 | 2.3 | 120 | 280 |
| 5 | sec.Na n-alkanesulfonate | 30 | 35 | 35 | 2.4 | 120 | 380 |
| 6 | $C_{12}H_{25}$—$CH=CH$—$CH_2SO_3K$ | 27 | 34 | 28 | 2.1 | 95 | 260 |
| 7 | $C_{14}H_{29}CH(OCOCH_3)$—$CH_2$—$SO_3Na$ | 27 | 33 | 26 | 2.0 | 100 | 250 |
| 8 | $C_{10-16}H_{21-33}CONH(CH_2)_2$—$SO_3Na$ | 26 | 34 | 26 | 2.0 | 95 | 250 |
| 9 | Na 2-(oleoylamino)-ethane-1-sulf. | 26 | 35 | 29 | 2.2 | 100 | 270 |
| 10 | sec.Na n-alkanesulfonate | 30 | 35 | 35 | 2.5 | 120 | 380 |
| 11 | $C_{12}H_{25}$—O—$(CH_2$—$CH_2$—$O)_2$—$SO_3Na$ | 26 | 33 | 28 | 2.3 | 100 | 280 |
| 12 | $C_{18}H_{37}CO$—$N(CH_3)$—$(CH_2)_2$—$SO_3Na$ | 28 | 34 | 29 | 2.3 | 100 | 280 |

TABLE II

| Example | Adhesion promoter content[1] % | Impact strength $mJ/mm^2$ | Notched impact strength $mJ/mm^2$ | Tensile impact strength $mJ/mm^2$ | Falling bolt test g |
|---|---|---|---|---|---|
| Comparison | — | 20 | 1.4 | 75 | 215 |
| 13 | 0.5 | 28 | 2.1 | 110 | 360 |
| 14 | 1.0 | 35 | 2.4 | 120 | 380 |
| 15 | 2.0 | 35 | 2.3 | 120 | 380 |

[1]relative to the amount of filler

Example 16

900 parts of the polyoxymethylene described in Example 1 and 1.5 parts of a sec.Na n-alkanesulfonate (chain distribution as in Example 10) are mixed for 15 minutes at room temperature in a high-speed mixer at 1,200 rpm. The polyoxymethylene thus treated is then mixed in a ploughshare mixer with 100 parts of calcium carbonate having a mean particle diameter of 2.5 $\mu m$ mixture is mixed for a further 5 minutes. Further processing takes place as described in Example 1.

In a comparative example, untreated calcium carbonate is mixed in the same way in a ratio of 2:8 with polyoxymethylene.

The properties of the test pieces are listed in Table IV.

TABLE IV

|  |  | Comparison | Example 17 |
|---|---|---|---|
| Elongation | % | 24 | 30 |
| Tensile strength | $N/mm^2$ | 48 | 46 |
| Impact strength | $mJ/mm^2$ | 36 | 51 |
| Notched impact strength | $mJ/mm^2$ | 2.6 | 3.4 |
| Tensile impact strength | $mJ/mm^2$ | 130 | 160 |
| Falling bolt test | g | 80 | 128 |

Example 18

400 parts of a precipitated calcium carbonate having a mean particle diameter of 0.2 μm and a specific surface area (according to BET) of 9 m$^2$/g are mixed for 10 minutes at room temperature in a high-speed mixer at 1,200 rpm with 6 parts of a sec.Na n-alkanesulfonate (chain distribution as in Example 10). After 1,600 parts of the polyoxymethylene described in Example 1 have been added, the mixture is mixed for a further 5 minutes. Further processing takes place as described in Example 1.

In a comparative example, untreated precipitated calcium carbonate is mixed in the same way in a ratio of 2:8 with polyoxymethylene.

The properties of the test pieces are listed in Table V.

Example 19

Example 18 is repeated, except that 6 parts of the compound $C_{10-16}H_{21-33}$—COO—CH$_2$—CH$_2$—SO$_3$—Na are used in place of the sec.Na n-alkanesulfonate.

The mixture is further processed as described in Example 1.

The properties of the test pieces are listed in Table V.

TABLE V

|  |  | Comparison | Example 18 | Example 19 |
|---|---|---|---|---|
| Elongation | % | 11 | 16 | 16 |
| Tensile strength | N/mm$^2$ | 56 | 52 | 50 |
| Impact strength | mJ/mm$^2$ | 20 | 32 | 29 |
| Notched impact strength | mJ/mm$^2$ | 2.0 | 2.8 | 2.7 |
| Tensile impact strength | mJ/mm$^2$ | 100 | 130 | 120 |
| Falling bolt test | g | 75 | 125 | 120 |

Example 20

800 parts of a precipitated calcium carbonate having a mean particle diameter of 1 μm are mixed for 10 minutes at room temperature in a high-speed mixer at 1,200 rpm with 12 parts of a sec.Na n-alkanesulfonate (chain distribution as in Example 10). After 1,200 parts of the polyoxymethylene described in Example 1 have been added, the mixture is mixed for a further 5 minutes. Further processing takes place as described in Example 1.

In a comparative example, untreated precipitated calcium carbonate is mixed in the same way in a ratio of 4:6 with polyoxymethylene.

The properties of the test pieces are listed in Table VI.

Example 21

Example 20 is repeated, except that 12 parts of the compound $C_{10-16}H_{21-33}$—CO—NH—CH$_2$—CH$_2$—SO$_3$—Na are used in place of the sec.Na n-alkanesulfonate.

The mixture is further processed as described in Example 1.

The properties of the test pieces are listed in Table VI.

TABLE VI

|  |  | Comparison | Example 20 | Example 21 |
|---|---|---|---|---|
| Elongation | % | 5 | 14 | 12 |
| Tensile strength | N/mm$^2$ | 38 | 35 | 37 |
| Impact strength | mJ/mm$^2$ | 8 | 25 | 20 |
| Notched impact strength | mJ/mm$^2$ | 1.3 | 2.1 | 1.9 |
| Tensile impact strength | mJ/mm$^2$ | 70 | 100 | 90 |
| Falling bolt test | g | 125 | 220 | 210 |

Example 22

400 parts of the calcium carbonate described in Example 1, 600 parts of the polyoxymethylene described in Example 1 and 6 parts of sec.Na n-alkanesulfonate (chain distribution as in Example 10) are mixed for 10 minutes at room temperature in a high-speed mixer at 1,200 rpm. Further processing takes place as described in Example 1. A mixture of 400 parts of calcium carbonate and 600 parts of polyoxymethylene are used as comparison.

The properties of the test pieces are listed in Table VII.

TABLE VII

|  |  | Comparison | Example 22 |
|---|---|---|---|
| Elongation | % | 13 | 30 |
| Tensile strength | N/mm$^2$ | 37 | 35 |
| Impact strength | mJ/mm$^2$ | 20 | 35 |
| Notched impact strength | mJ/mm$^2$ | 1.4 | 2.5 |
| Tensile impact strength | mJ/mm$^2$ | 75 | 120 |
| Falling bolt test | g | 215 | 380 |

Example 23

600 parts of the calcium carbonate described in Example 1 are mixed for 15 minutes at room temperature in a high-speed mixer at 1,200 rpm with 9 parts of a sec.Na n-alkanesulfonate (chain distribution as in Example 10). After 400 parts of the polyoxymethylene described in Example 1 have been added, the mixture is mixed for a further 5 minutes. Further processing takes place as described in Example 1. A mixture of 600 parts of calcium carbonate and 400 parts of polyoxymethylene is used as comparison.

The properties of the test pieces are listed in Table VIII.

TABLE VIII

|  |  | Comparison | Example 23 |
|---|---|---|---|
| Elongation | % | 1 | 14 |
| Tensile strength | N/mm$^2$ | 56 | 29 |
| Impact strength | mJ/mm$^2$ | 4 | 15 |
| Notched impact strength | mJ/mm$^2$ | 0.9 | 1.7 |
| Tensile impact strength | mJ/mm$^2$ | 55 | 85 |
| Falling bolt test | g | 230 | 480 |

Examples 24–26

These Examples compare the adhesion promoters according to the invention with customary adhesion promoters. In each case mixtures of 400 parts of calcium carbonate of Example 1 and treated with 4 parts of adhesion promoter and 600 parts of the polyoxymethylene of Example 1 are prepared and further processed as described in Example 1. Example 5 represents the adhesion promoters according to the invention. In Example 24, stearic acid is mixed in as described in Examples 2-9. In Example 25, γ-glycidoxypropyltrimethoxysilane, and in Example 26 isopropoxytriisostearoyl titanate, is sprayed on undiluted from an atomizing device as described in Example 10.

The properties of the test pieces are listed in Table IX.

TABLE IX

|  |  | Example 5 | Example 24* | Example 25* | Example 26* |
|---|---|---|---|---|---|
| Elongation | % | 30 | 22 | 13 | 24 |
| Tensile strength | N/mm² | 35 | 36 | 37 | 33 |
| Impact strength | mJ/mm² | 35 | 27 | 20 | 27 |
| Notched impact strength | mJ/mm² | 2.4 | 1.9 | 1.5 | 1.9 |
| Tensile impact strength | mJ/mm² | 120 | 90 | 80 | 100 |
| Falling bolt test | g | 380 | 240 | 215 | 240 |

*Comparison

Example 27

Table X shows the yellowness values of injection-molded sheets as measured in accordance with DIN 6,167. Here, as described in Example 14, 1% of the sec.Na n-alkanesulfonate used there is mixed with various calcium carbonates.

TABLE X

| Calcium carbonate of Example | CaCO₃ content % | Adhesion promoter | Yellowness value |
|---|---|---|---|
| 1 | 60 | − | 36.5 |
| 1 | 60 | + | 17.9 |
| 16 | 10 | − | 29.6 |
| 16 | 10 | + | 20.3 |
| 16 | 20 | − | 38.8 |
| 16 | 20 | + | 22.2 |
| 16 | 40 | − | 43.1 |
| 16 | 40 | + | 24.5 |
| 17 | 20 | − | 26.0 |
| 17 | 20 | + | 13.0 |

Example 28

600 parts of calcium carbonate having a mean particle diameter of 3 μm and a specific surface area (according to BET) of 2.5 m²/g is mixed for 10 minutes at room temperature in a high-speed mixer with 9 parts of sec.Na n-alkanesulfonate (carbon chain distribution as in Example 10). After 1,400 parts of the polyoxymethylene as described in Example 1 have been added, the mixture is mixed for a further 5 minutes. The mixture obtained is melted in a type LSM 30/34 twin-screw extruder from Messrs. Leistritz. The melt is forced through a nozzle, taken off as a strand and granulated by means of a cutting device.

In a comparative example, 600 parts of untreated calcium carbonate are mixed in the same way with 1,400 parts of polyoxymethylene. The mixture is further processed as described above, under the same extrusion conditions. Table XI shows the throughputs with in each case identical performance of the extruder.

Example 29

Example 28 is repeated, except that a precipitated calcium carbonate having a mean particle diameter of 0.2 μm and a specific surface area (according to BET) of 9 m²/g is used.

TABLE XI

|  | Throughput kg/h |
|---|---|
| Example 28 | 6.0 |
| Comparison with Example 28 | 5.2 |
| Example 29 | 6.7 |
| Comparison with Example 29 | 4.8 |

We claim:

1. A molding composition comprising 90-20 parts by weight of a polymer consisting of a polyoxymethylene polymer, 10-80 parts by weight of an alkaline earth metal carbonate, and a discoloration-reducing amount within the range of 0.1-10 parts by weight, relative to the alkaline earth metal carbonate, of an adhesion promoter, which contains as adhesion promoter a sulfur-organic compound of the formula $$R-SO_3-Me \quad (I)$$

in which R represents the following radicals:
straight-chain or branched alkyl radical having 6 to 35 carbon atoms or a cycloalkyl radical or alkenyl radical each having 6 to 22 carbon atoms, and the alkenyl radical contains at least one double bond and all these radicals can be substituted by hydroxyl groups or the radicals —OCOR¹ or —COOR¹ in which R¹ represents a straight-chain or branched alkyl radical having 1 to 6 carbon atoms,
an alkylaryl radical having 7 to 22 carbon atoms and which can be substituted in the above manner,
$R^2-O(CH_2CH_2O)_m-$ in which $R^2$ denotes an alkyl radical having 6 to 22 carbon atoms and m denotes 1 to 4,
$R^2-CO-O-(CH_2)_n-$ in which $R^2$ has the above meaning and n is equal to 2 to 6, $$R^2-CO-N-(CH_2)_n$$
$$|$$
$$R^3$$

in which $R^2$ and n have the above meaning and $R_3$ represents hydrogen or a straight-chain or branched alkyl radical having 1 to 6 carbon atoms, and Me denotes an alkali metal ion or alkaline earth metal cation.

2. A molding composition as claimed in claim 1, in which the amount of adhesion promoter is 0.5 to 2 parts by weight.

3. A molding composition as claimed in claim 1, in which the alkaline earth metal carbonate is a calcium carbonate.

4. A process for preparing a filler-containing plastic molding composition comprising 90-20 parts by weight of a polyoxymethylene, 10-80 parts by weight of an alkaline earth metal carbonate, and a discoloration-reducing amount within the range of 0.1-10 parts by weight, relative to the alkaline earth metal carbonate, of an adhesion promoter, by mixing of the constitutents, which comprises using as the adhesion promoter a sulfur-organic compound of the formula $$R-SO_3-Me \qquad (I)$$

in which R has the meaning of claim 1.

5. The process as claimed in claim 4, wherein the calcium carbonate is first treated with the adhesion promoter.

6. A molding composition as claimed in claim 2, in which the alkaline earth metal carbonate is a calcium carbonate.

7. A method for preparing shaped articles with improved color comprising the step of molding a said article using the plastic molding composition as claimed in claim 1, wherein a reduction in the discoloration of said shaped articles is provided by the discoloration-reducing amount of the adhesion promoter.

8. A molding composition according to claim 1, wherein said composition consists essentially of the polyoxy methylene, the alkaline earth metal carbonate, and the adhesion promoter and contains as an additive a known stabilizer, nucleating agent, antistatic agent, flame retardant, lubricant, plasticizer, pigment, dyestuff, optical brightner, or mold release agent.

* * * * *